US008826014B2

(12) United States Patent
Jennings et al.

(10) Patent No.: US 8,826,014 B2
(45) Date of Patent: Sep. 2, 2014

(54) AUTHENTICATION OF REMOTE HOST VIA CLOSED PORTS

(75) Inventors: Jeffery Bart Jennings, Raleigh, NC (US); Kofi Kekessie, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1428 days.

(21) Appl. No.: 11/040,265

(22) Filed: Jan. 21, 2005

(65) Prior Publication Data
US 2006/0168654 A1 Jul. 27, 2006

(51) Int. Cl.
*H04L 9/32* (2006.01)
*H04L 29/06* (2006.01)

(52) U.S. Cl.
CPC ..................... *H04L 63/08* (2013.01)
USPC ........... 713/168; 713/155; 713/161; 713/170; 713/176; 726/2; 726/11; 726/12; 726/14; 380/247; 380/239; 380/232; 380/259; 380/260; 380/277; 380/278; 380/279; 380/285; 380/30

(58) Field of Classification Search
CPC ..................................... H04L 63/08
USPC ............ 726/2, 11, 12, 14; 380/247, 239, 232, 380/259–260, 277, 278–286, 30; 713/155, 713/161, 168, 170, 176, 2, 11, 12, 14
See application file for complete search history.

(56) References Cited

U.S. PATENT DOCUMENTS

| | | | |
|---|---|---|---|
| 5,586,260 A | 12/1996 | Hu | |
| 5,602,918 A * | 2/1997 | Chen et al. | 713/153 |
| 5,757,795 A * | 5/1998 | Schnell | 370/392 |
| 5,878,143 A * | 3/1999 | Moore | 705/75 |
| 6,088,796 A * | 7/2000 | Cianfrocca et al. | 713/152 |
| 6,470,389 B1 * | 10/2002 | Chung et al. | 709/227 |
| 6,598,167 B2 | 7/2003 | Devine et al. | |
| 6,631,417 B1 | 10/2003 | Balabine | |
| 7,380,123 B1 * | 5/2008 | Hernacki et al. | 713/168 |
| 2003/0018914 A1 * | 1/2003 | Cheng et al. | 713/201 |
| 2003/0167410 A1 * | 9/2003 | Rigstad et al. | 713/201 |
| 2003/0210689 A1 * | 11/2003 | Davis et al. | 370/389 |
| 2004/0088409 A1 * | 5/2004 | Braemer et al. | 709/225 |
| 2004/0098616 A1 * | 5/2004 | Jenner et al. | 713/201 |
| 2004/0117658 A1 * | 6/2004 | Klaes | 713/201 |
| 2004/0181664 A1 * | 9/2004 | Hoefelmeyer et al. | 713/157 |
| 2004/0190715 A1 * | 9/2004 | Nimura et al. | 380/44 |
| 2005/0213582 A1 * | 9/2005 | Wakumoto et al. | 370/395.3 |
| 2006/0104288 A1 * | 5/2006 | Yim et al. | 370/395.52 |

OTHER PUBLICATIONS

Mark L. Green, "Grid-Enabled Virtual Organization Based Dynamic Firewall", IEEE, Computer Society, Nov. 8, 2004, pp. 1-9.*
Rennie deGraaf et al., "Improved Port Knocking with Strong Authentication," IEEE Computer Society, Proceeding of the 21 st Annual Securitu Application Conference (ACSAC 2005), pp. 1-10.*
Martin Krywinski, "Port knocking from the inside out," SysAdmin magazine, 2003, pp. 1-20.*

* cited by examiner

*Primary Examiner* — Luu Pham
*Assistant Examiner* — Canh Le
(74) *Attorney, Agent, or Firm* — Steven M. Greenberg, Esq.; CRGO Law

(57) ABSTRACT

A method, system and apparatus for authenticating a communication request sent from a client computing device. The communication request is initially blocked by a firewall preventing delivery to a server. A first logging event corresponding to the communication request is created. The communication request and the logging event are stored in a firewall. The server is notified of the first logging event. The communication request corresponding to the first logging event is authenticated. A port in the firewall is enabled if the communication request is authenticated.

14 Claims, 3 Drawing Sheets

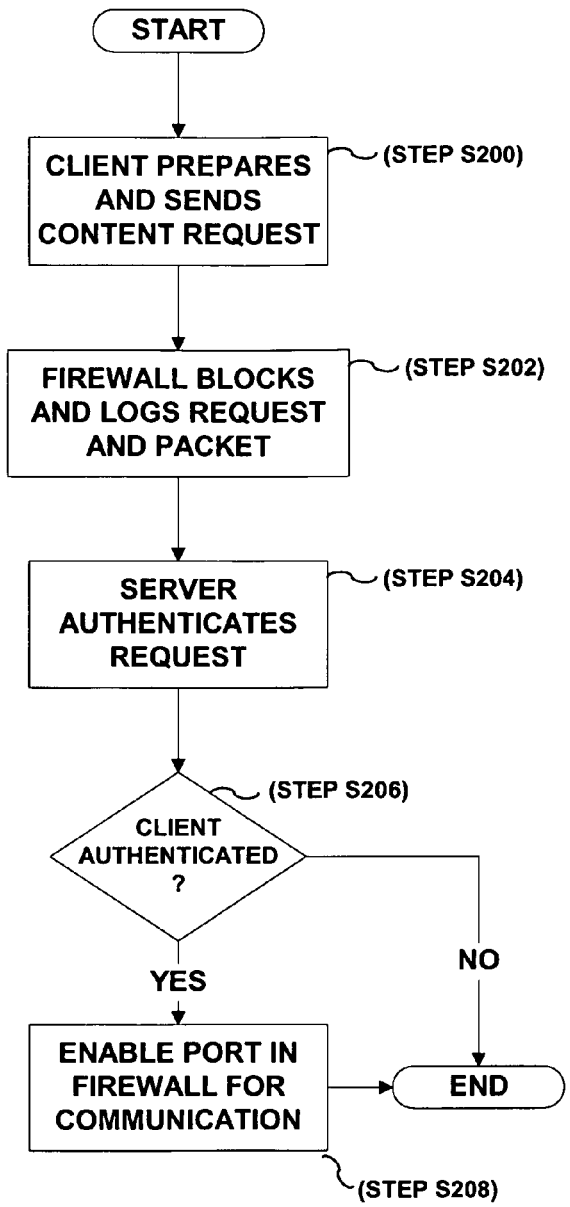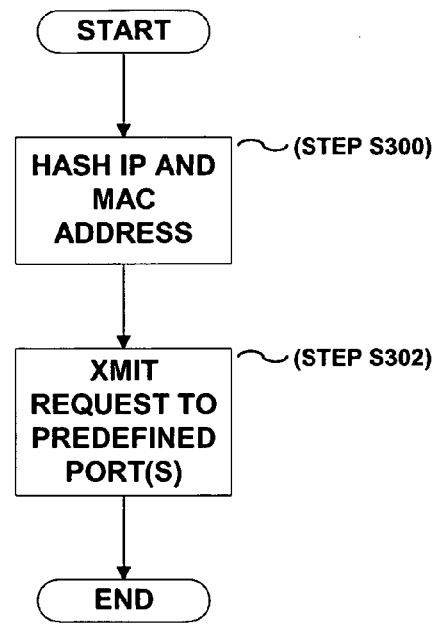
FIG. 2
FIG. 3

AUTHENTICATION OF REMOTE HOST VIA CLOSED PORTS

BACKGROUND OF THE INVENTION

1. Statement of the Technical Field

The present invention relates to network communication security and more particularly to a method and system for allowing a server to authenticate a client without initially permitting direct communication between these devices.

2. Description of the Related Art

With the proliferation of public access communication networks such as the Internet, security and integrity of data is a concern that permeates society. Related to this concern is the availability of server resources and the need to provide availability and access to potentially sensitive data in the face of malicious unauthorized access attempts, i.e., hackers, as well as attempts to destroy data and computing resources, i.e., viruses and worms. These computer hackers and viruses and worms are constantly probing and analyzing networks, servers and other computing resources for vulnerabilities that can be exploited.

Many schemes for protecting data and unauthorized access to computing resources exist, ranging from general password protection to more sophisticated firewall arrangements. As typically occurs in Internet communications, when a client computer seeks to access a web server, the request in the form of an Internet Protocol ("IP") packet is routed through a series of networks. IP layers, such as the Transmission Control Protocol ("TCP") layer uses a logical port number assigned to each message so that the recipient device can determine the type of service being is requested/provided. These logical ports are therefore reference numbers used to define a service. Logical port numbers are straight unsigned integer values which range up to a value of 65535. Some logical ports are assigned, some reserved and many unassigned which may be utilized by application programs. For instance, the hypertext transfer protocol ("HTTP") uses port 80 to provide web browsing services.

In order to allow services like internet web browsing to be used, the supporting ports, like port 80, are typically left unblocked by firewalls so that the corresponding data, for example a request for information, can be received by the web server. Once the data has passed through the firewall, the web server typically blindly accepts the data, processes it and sends the result back to the originating client computer. Such can even be the case where a web server receives a request and replies by requesting a password and/or ID.

These arrangements make the servers vulnerable to the above-described attacks. These arrangements also disadvantageously require a significant amount of administration by requiring administrators to constantly update firewall rule sets after the attacks have been made. It is therefore desirable to have a system and method which allows client computers to communicate with servers via a firewall in which the firewall does not need to have certain ports allowed by default, i.e. the firewall blocks all incoming traffic regardless of port number.

SUMMARY OF THE INVENTION

The present invention addresses the deficiencies of the art in respect to authentication and provides a novel and non-obvious method, system and apparatus for authenticating a client computer to a server. In this regard, a multilayered authentication technique is used to prevent virus/worms and hackers from scanning ports. The multilayered technique advantageously prevents initial direct communication, e.g. communication sessions, between the client computer and the server by logging the communication request in a firewall and notifying the server that a client communication request is pending.

According to one aspect, the present invention provides a system for authenticating a communication request sent from a client computing device in which a firewall is in data communication with a server. The firewall has a processing unit and a storage unit. The processing unit operates to perform functions including initially blocking the communication request and creating a first logging event corresponding to the communication request. The storage unit stores the communication request and the logging event. The server is in data communication with the firewall. The server has a processing unit operating to perform functions including receiving notification of the first logging event created by the firewall, authenticating the communication request corresponding to the first logging event and enabling a port in the firewall if the communication request is authenticated.

According to another aspect, the present invention provides a method for authenticating a communication request sent from a client computing device in which the communication request is initially blocked to prevent delivery to a server. A first logging event corresponding to the communication request is created. The communication request and the logging event are stored in a firewall. The server is notified of the first logging event. The communication request corresponding to the first logging event is authenticated. A port in the firewall is enabled if the communication request is authenticated.

According to still another aspect, a machine readable storage device having stored thereon a computer program for authenticating a communication request sent from a client computing device is provided. The computer program includes a set of instructions which when executed by a machine causes the machine to perform a method in which the communication request is initially blocked to prevent delivery to a server. A first logging event corresponding to the communication request is created. The communication request and the logging event are stored in a firewall. The server is notified of the first logging event. The communication request corresponding to the first logging event is authenticated. A port in the firewall is enabled if the communication request is authenticated.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 2 is a flow chart of the overall process of the present invention;

FIG. 3 is a flow chart of the client content request preparation and transmission process (Step S200) of FIG. 2.

DETAILED DESCRIPTION OF THE PREFERRED EMBODIMENTS

The present invention advantageously provides a method, system and apparatus for allowing communication between a server, such as a web server, and a client computer, such as a computer running web browser software, in a manner which allows the server to authenticate the client computer using a multi-layered authentication and data exchange technique. This technique does not require the firewall to respond to the requests and does not initially allow the client computer to directly communicate with the server. As used herein, references to authentication of the client computer is intended to include authentication of the actual client computer and/or a user of the computer.

Figure 1:
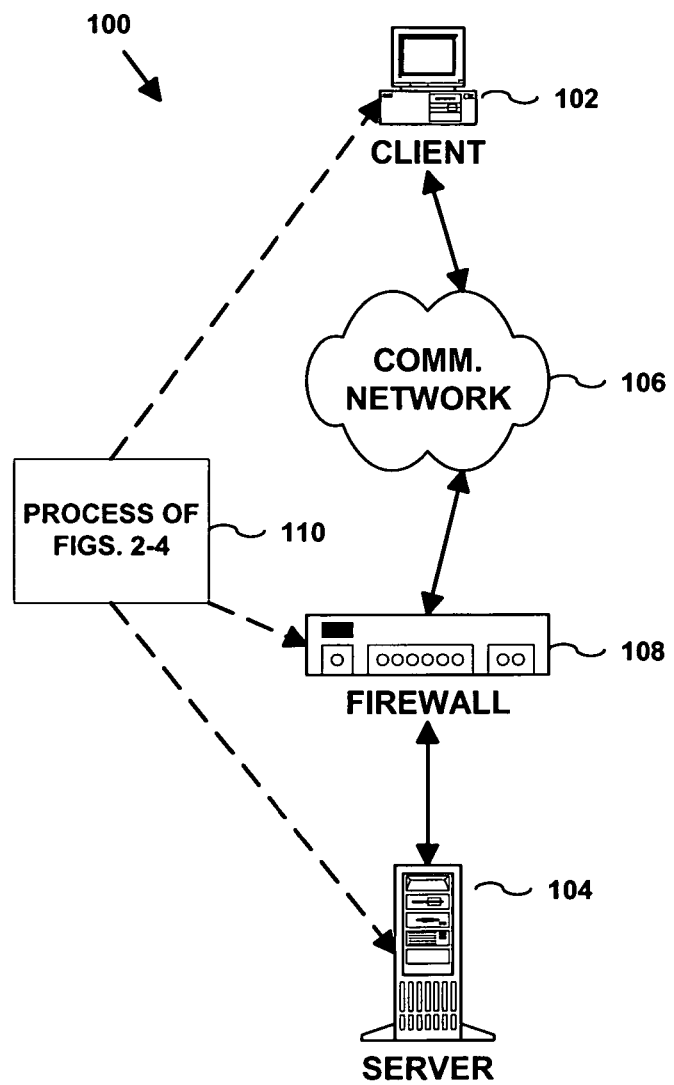
FIG. 1 is a diagram of an exemplary system constructed in accordance with the principles of the present invention.

Referring now to the drawing figures in which like reference designators refer to like elements there is shown in FIG. 1 a system constructed in accordance with the principles of the present invention and designated generally as "100". System 100 includes client computer 102 coupled to server 104 through network 106 and firewall 108. Network 106 can be any computer network capable of transporting data between client computer 102 and firewall 108. As used herein, the term "data" includes all forms of digital communication including but not limited to alpha-numeric information, audio, video, and any other form of encoded or encrypted information. Further, although firewall 108 and server 104 are shown as separate elements in FIG. 1 and are described separately herein, it is understood that firewall 108 and server 104 can be implemented as a single physical unit with the functions of each device performed by one or more processing units and associated computing hardware in one or more physical chassis.

Client computer 102 can be any computing device capable of requesting information from a server, such as may be provided by web browsing software. For example, client computer 102 can be a desktop or laptop computer, a personal digital assistant ("PDA") and the like. Client computer 102 includes hardware components as known in the art and as may be required to implement the functions of the present invention described herein. For example, client computer 102 can include a storage unit such as volatile or non-volatile memory, a central processing unit, input and output devices, network interface hardware, display units and the like, controlled by an operating system and/or one or more application software programs.

Similarly, server 104 generally includes the same types of hardware components described above with respect to computer 102. Server 104 is arranged to provide information to client 102 based on requests initiated by client 102. For example, server 104 can be a web server. The hardware elements of server 104 are arranged to provide the functions described herein with respect to the authentication of a request for information, i.e., content request originated by client 102.

Firewall 108 generally includes the hardware described above with respect to client computer 102, including the storage unit and processing unit, and includes the programmatic software needed to implement the functions described herein. Of note, it is presumed that one or ordinary skill in the art can write programmatic software using a known computing software language to implement the functions of the invention described herein as may be performed by client computer 102, server 104 and/or firewall 108. Authentication process 110 is performed by client computer 102, server 104 and/or firewall 108.

The overall process, authentication process 110, of the invention is described with reference to FIG. 2. Initially, client computer 102 prepares and sends a request for content to server 104 (Step S200). The intended destination of the request is addressed to what the client computer 102 believes is the address, such as a TCP/IP address of server 104. Firewall 108 operates to initially block the communication request sent by client computer 102 and logs the request as well as the data and/or packet(s) embodying the request in its storage unit (Step S202). Server 104 is notified that a log entry has been made in firewall 108 for communication and evaluates the request (Step S204) to determine whether the client should be authenticated (Step S206). If the client is authenticated, the communication request is honored and server 104 instructs firewall 108 to enable one or more ports in the firewall to allow communication between client 102 and server 104 (Step S208).

For example, client 102 may be requesting web content from server 104. If the communication request is authenticated, server 104 may instruct firewall 108 to enable port TCP/IP port 80 to allow client 102 to communicate with server 104 using the well known http port as this port is commonly used for TCP/IP web communication.

As noted above, with respect to Step S204, server 104 receives notification that firewall 108 has logged a communication request from client 102 for content. It is contemplated that this notification can be received in any number of ways. For example, server 104 can monitor the log in firewall 108 to determine when an entry for a communication request has been made. As another example, firewall 108 can proactively notify server 104 of the creation of a communication request log entry. In other words, the notification of the communication request log entry can be pushed to server 104 or can be pulled from firewall 108. Techniques for pushing and pulling data and for monitoring log computer log entries are known and are not described herein.

A detailed example of the client content request preparation and transmission process of Step S200 is described with reference to FIG. 3. The first layer of the multi-layer authentication technique of the present invention is a matching of a hash of addresses corresponding to the requesting client computer 102. Accordingly, client computer 102 hashes its IP and MAC address (Step S300). The hash can be performed using a predetermined hashing protocol or a dynamically changing protocol, such as is done by the SECUREID system. It is also contemplated that positional coordinates using global position system ("GPS") enhanced computers can also be factored into the hashing algorithm, thereby adding an additional layer of location-specific security to the system.

The communication request transmitted by client 102 and stored in the storage unit of firewall 108 therefore includes the hashed addresses (and optional GPS positional coordinates) as well as these same addresses and coordinates in the clear, i.e., not hashed. The communication request is transmitted to a predefined port(s) or a series of ports in a predetermined order (Step S302). As noted above, with respect to Step S202 in FIG. 2, stateful firewall 108 intercepts the request destined for server 104.

By blocking all communication requests at firewall 108, the present invention blocks all hackers and viruses/worms from reaching server 104. Initially, the only knowledge that server 104 has of the communication request from client 102 is notification of the log entry.

Figure 4:
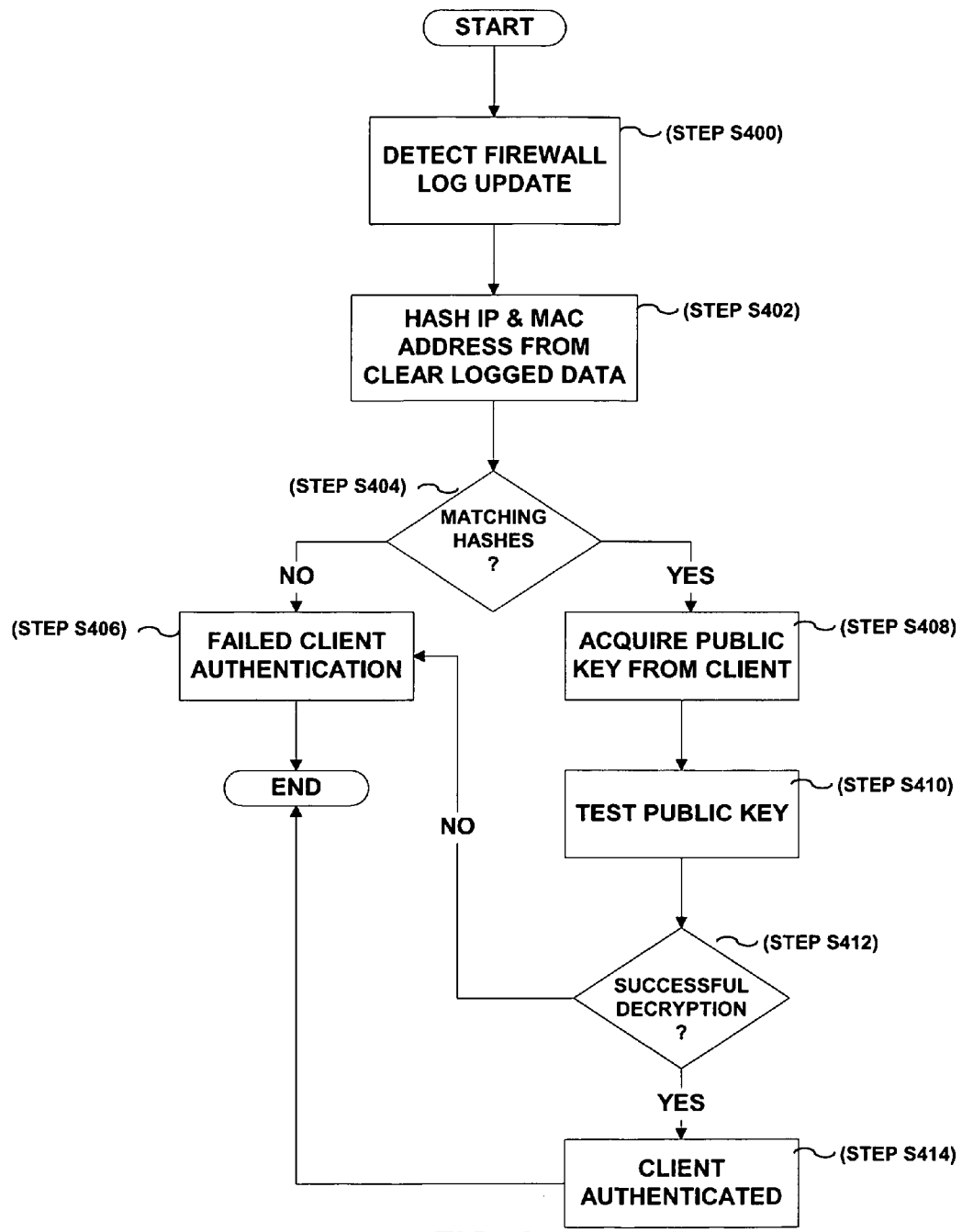
FIG. 4 is a flow chart of the process of authenticating the client computer communication request (Step S204) of FIG. 2.

The authentication of the communication request (Step S204) of FIG. 2 is explained in detail with reference to FIG. 4. Initially, server 104 detects that the log in firewall 108 has been updated (Step S400). Methods for notifying server 104 of a firewall log update are described above. Server 104 obtains the communication request stored in firewall 108 along with the logging data and hashes the clear IP and MAC address in the communication request (Step S402) using the same hashing algorithm used by client computer 102. Server 104 compares the addresses it hashed with the hashed addresses (and optional GPS positional information) created by client computer 102 and included in the communication request to determine if the two hashes match (Step S404). If the hashes do not match, the authentication fails (Step S 406) and the communication request is not honored by server 104. Matching hashes are a strong indication that client computer 102 is not "spoofed" i.e. that the communication request was actually initiated by client computer 102 and not an imposter.

If the hashes match, the first layer of the multi-layer authentication process is deemed successful and server 104 sends a unicast request to client computer 102 asking for the server's public encryption key (Step S408). The public key can be per IP port or per service. The public key is typically distributed to client computer 102 at the time the corresponding communication software and/or application and/or operating system is installed. Upon receiving the request, client computer 102 transmits the public key to server 104.

However, as with the initial communication request, because no ports have been opened to allow direct communication from client computer 102 to server 104, the packet(s) containing the public key are blocked by firewall 108. Firewall 108 logs the receipt of the public key and stores this log entry as well as the corresponding public key in its storage unit. As with the initial communication request, server 104 is notified of the log entry. Server 104 obtains the public key from firewall 108 and tests the public key (Step S410). The public key can be tested by server 104, for example, by encrypting test data with the public key and then trying to decrypt the same data using its private keys. If the decryption is successful, the client (communication request) are authenticated (Step S414). If the decryption is not successful, the authentication has failed (Step S406).

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A system for authenticating a communication request sent from a client computing device, the system comprising:
   a firewall that initially blocks all incoming traffic regardless of port number, the firewall comprising:
      a processing unit operating to perform functions including:
         initially blocking the communication request;
         creating a first logging event corresponding to the communication request; and
      a storage unit, the storage unit storing the communication request and the first logging event; and
   a server in data communication with the firewall, the server having a processing unit, the processing unit operating to perform functions including:
      receiving notification of the first logging event created by the firewall; authenticating the communication request corresponding to the first logging event using a multi-layer authentication process including a first layer authentication of the communication request that includes generating a second hash of a plurality of clear addresses corresponding to the client computing device by the server using the same hashing algorithm and matching the second hash with the first hash and a second layer authentication of the communication request that includes transmitting a request to the client computing device for a public key corresponding to the server if the first and second hashes match; and
      enabling a port in the firewall only if the communication request is authenticated by the first and second layer authentications.

2. The system according to claim 1, wherein the communication request contains a plurality of clear addresses corresponding to the client computing device and a first hash of the plurality of clear addresses generated by the client computing device using a predetermined hashing algorithm.

3. The system according to claim 1, wherein the second layer authentication further includes
   the firewall
      receiving the public key corresponding to the server from the client computing device;
      creating a second logging event corresponding to the public key storing the second logging event and the public key in the firewall storage unit;
      notifying the server of the second logging event; and
   the server
      receiving the notification of the second logging event;
      acquiring the public key from the firewall; and
      testing the public key.

4. The system according to claim 2, wherein the plurality of clear addresses corresponding to the client computing device include an Internet Protocol Address and a Media Access Control layer address.

5. A method for authenticating a communication request sent from a client computing device directed to a server, the method comprising:
   initially blocking the communication request from delivery to the server by a firewall that initially blocks all incoming traffic regardless of port number;

creating a first logging event corresponding to the communication request;

storing the communication request and the first logging event in the firewall;

notifying the server of the first logging event;

authenticating the communication request corresponding to the first logging event by the server using a multi-layer authentication process including a first layer authentication of the communication request that includes generating a second hash of a plurality of clear addresses corresponding to the client computing device by the server using the same hashing algorithm and matching the second hash with the first hash and a second layer authentication of the communication request that includes transmitting a request to the client computing device for a public key corresponding to the server if the first and second hashes match; and enabling a port in the firewall only if the communication request is authenticated by the first and second layer authentication.

6. The method according to claim 5, wherein the communication request contains a plurality of clear addresses corresponding to the client computing device and a first hash of the plurality of clear addresses generated by the client computing device using a predetermined hashing algorithm.

7. The method according to claim 5, wherein the second layer authentication further includes:

receiving the public key from the client computing device, the public key corresponding to the server;

creating a second logging event corresponding to the received public key;

storing the second logging event and the received public key;

notifying the server of the second logging event; and testing the received public key.

8. The method according to claim 6, wherein the plurality of clear addresses corresponding to the client computing device include an Internet Protocol Address and a Media Access Control layer address.

9. The method according to claim 5, wherein the first hash and the second hash further include positional coordinates corresponding to the client computing device.

10. A machine readable storage device having stored thereon a computer program for authenticating a communication request sent from a client computing device directed to a server, the computer program comprising a set of instructions which when executed by a machine causes the machine to perform a method including:

initially blocking the communication request from delivery to the server by a firewall that blocks all incoming traffic regardless of port number;

creating a first logging event corresponding to the communication request;

storing the communication request and the first logging event in the firewall;

notifying the server of the first logging event;

authenticating the communication request corresponding to the first logging event by the server using a multi-layer authentication process including a first layer authentication of the communication request that includes generating a second hash of a plurality of clear addresses corresponding to the client computing device by the server using the same hashing algorithm and matching the second hash with the first hash and a second layer authentication of the communication request that includes transmitting a request to the client computing device for a public key corresponding to the server if the first and second hashes match; and enabling a port in the firewall only if the communication request is authenticated by the first and second layer authentication.

11. The machine readable storage device according to claim 10, wherein the communication request contains a plurality of clear addresses corresponding to the client computing device and a first hash of the plurality of clear addresses generated by the client computing device using a predetermined hashing algorithm.

12. The machine readable storage device according to claim 10, wherein the second layer authentication further includes:

receiving the public key from the client computing device, the public key corresponding to the server;

creating a second logging event corresponding to the received public key;

storing the second logging event and the received public key;

notifying the server of the second logging event; and testing the received public key.

13. The machine readable storage device according to claim 11, wherein the plurality of clear addresses corresponding to the client computing device include an Internet Protocol Address and a Media Access Control layer address.

14. The machine readable storage device according to claim 10, wherein the first hash and the second hash further include positional coordinates corresponding to the client computing device.

* * * * *